(No Model.)

C. OLESON.
VEHICLE SEAT.

No. 476,811. Patented June 14, 1892.

Witnesses

Inventor
Carl Oleson.

By his Attorneys,

UNITED STATES PATENT OFFICE.

CARL OLESON, OF ROLAND, IOWA.

VEHICLE-SEAT.

SPECIFICATION forming part of Letters Patent No. 476,811, dated June 14, 1892.

Application filed December 28, 1891. Serial No. 416,348. (No model.)

*To all whom it may concern:*

Be it known that I, CARL OLESON, a citizen of the United States, residing at Roland, in the county of Story and State of Iowa, have invented a new and useful Vehicle-Seat, of which the following is a specification.

The invention relates to improvements in vehicle-seats.

The object of the present invention is to provide for carriages, buggies, and other vehicles a seat having a supplemental seat connected to it and adapted to be extended in front of it for convenience in driving and for seating more than two occupants.

The invention consists in the construction and novel combination and arrangement of parts, hereinafter fully described, illustrated in the accompanying drawings, and pointed out in the claims hereto appended.

Figure 1:
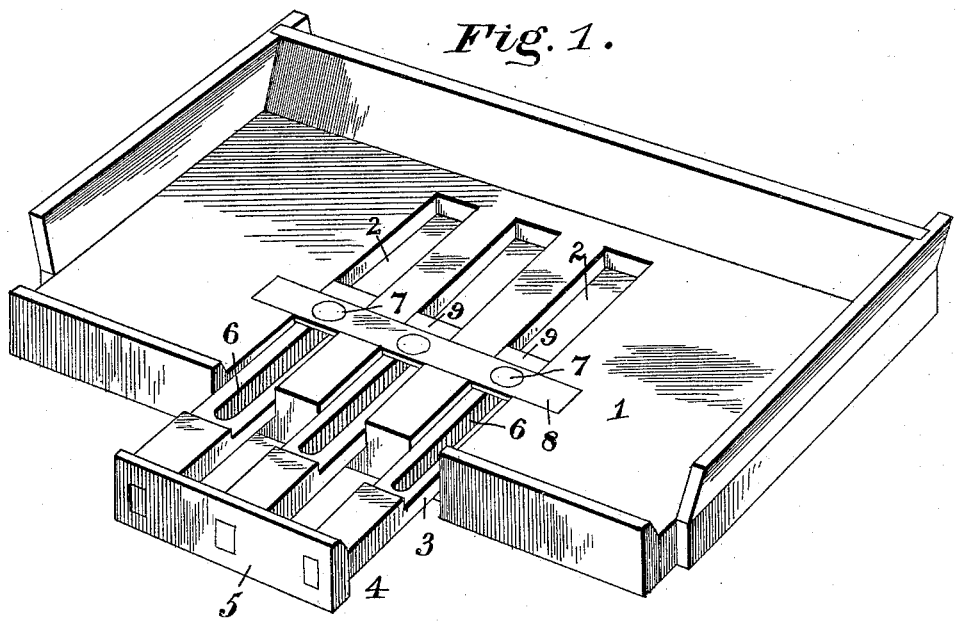
Figure 2:
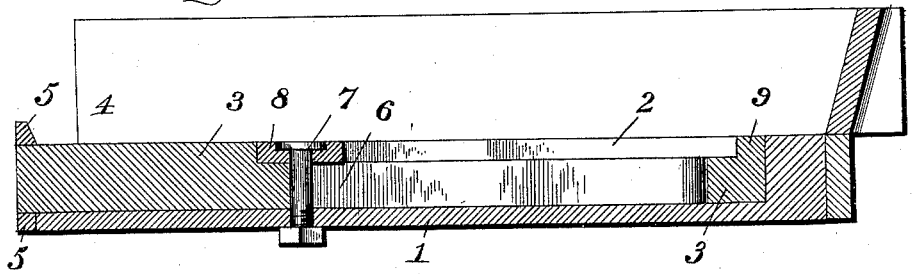

In the drawings, Figure 1 is a perspective view of a portion of the frame of a carriage-seat having a supplemental seat constructed in accordance with this invention. Fig. 2 is a sectional view taken longitudinally of the supplemental seat.

Like numerals of reference indicate corresponding parts in both the figures of the drawings.

1 designates a main seat-frame provided at its middle with a series of transverse grooves 2, in which are arranged sliding bars 3 of a supplemental seat 4. The sliding bars 3 are connected at their front ends by a cross-bar 5 and are provided with longitudinal slots 6, through which pass bolts 7. The bolts 7 extend through the main seat and through a strip 8, which is set into the main seat-frame and spans the grooves thereof and secures the slides in the grooves. The rear ends of the sliding bars are provided with shoulders 9, arranged to engage the strip 8 when the supplemental seat is extended to prevent the same being entirely withdrawn.

The main seat-frame is designed to be cushioned in the usual manner, as will be readily understood, and when the supplemental seat is extended it is designed to place a cushion on it to make it as high as the main seat.

It will readily be seen that the supplemental seat is simple and inexpensive in construction, that it is adapted to be readily extended for the convenience of the occupants of a vehicle, and that when not in use it is concealed within the main seat.

What I claim is—

1. The combination of a main seat provided in its face with parallel grooves, a supplemental seat composed of a series of sliding bars arranged in the grooves and adapted to be extended from the seat when in use and to be returned within the grooves when not in use, and means for securing the bars in the grooves, substantially as described.

2. The combination of a main seat provided with grooves, a strip spanning the grooves, and a supplemental seat provided with sliding bars arranged in said grooves and provided at their rear ends with projections to engage the strip and having longitudinal slots and bolts passing through the strip and arranged in the slots of the sliding bars, substantially as described.

In testimony that I claim the foregoing as my own I have hereto affixed my signature in the presence of two witnesses.

CARL OLESON.

Witnesses:
O. A. OLESON,
GEORGE HOLLAND.